(12) United States Patent
Raynor

(10) Patent No.: US 9,067,483 B2
(45) Date of Patent: Jun. 30, 2015

(54) ELECTRIC VECHICLE DRIVE MECHANISM FOR DRIVING MULTIPLE ALTERNATORS

(76) Inventor: Maurice W. Raynor, Los Angeles, CA (US)

(*) Notice: Subject to any disclaimer, the term of this patent is extended or adjusted under 35 U.S.C. 154(b) by 919 days.

(21) Appl. No.: 12/288,440

(22) Filed: Oct. 21, 2008

(65) Prior Publication Data

US 2010/0096199 A1    Apr. 22, 2010

(51) Int. Cl.
B60K 1/00 (2006.01)
B60K 8/00 (2006.01)
B60K 1/04 (2006.01)

(52) U.S. Cl.
CPC ... *B60K 8/00* (2013.01); *B60K 1/00* (2013.01); *B60K 1/04* (2013.01)

(58) Field of Classification Search
CPC ........................................... B60W 10/08
USPC ............................ 180/65.1, 65.21
See application file for complete search history.

(56) References Cited

U.S. PATENT DOCUMENTS

| | | | | |
|---|---|---|---|---|
| 3,773,132 A * | 11/1973 | Gawlik et al. | ................ | 180/291 |
| 5,343,974 A * | 9/1994 | Rabek | ............. | 180/216 |
| 5,821,653 A * | 10/1998 | Kinto et al. | .................... | 310/89 |
| 5,921,338 A * | 7/1999 | Edmondson | ............. | 180/65.51 |
| 5,937,961 A * | 8/1999 | Davidson | ....................... | 180/166 |
| 6,059,684 A * | 5/2000 | Sasaki et al. | ................ | 475/206 |
| 6,522,960 B2 * | 2/2003 | Nada | ............................ | 701/22 |
| 7,215,034 B2 * | 5/2007 | Hino et al. | .................. | 290/40 C |
| 7,271,555 B1 * | 9/2007 | Ciccone | ..................... | 318/139 |
| 7,347,294 B2 * | 3/2008 | Gonzalez | .................... | 180/65.1 |
| 7,416,039 B1 * | 8/2008 | Anderson et al. | ............ | 180/165 |
| 8,256,549 B2 * | 9/2012 | Crain et al. | ............... | 180/65.31 |
| 8,302,724 B2 * | 11/2012 | Gillingham et al. | .......... | 180/242 |

* cited by examiner

Primary Examiner — Jeffrey J Restifo
Assistant Examiner — Erez Gurari
(74) Attorney, Agent, or Firm — Imperium Patent Works; T. Lester Wallace; Amir V. Adibi

(57) ABSTRACT

An electric vehicle drive mechanism comprises a plurality of alternators, an energy storage system, a gear system, and a telescoping shaft. The telescoping shaft comprises shaft portions that extend along an axle of the vehicle. When the vehicle is in motion, the telescoping shaft drives the alternators through the gear system. Electrical energy generated by the alternators is supplied to the energy storage system.

17 Claims, 21 Drawing Sheets

ELECTRIC VECHICLE DRIVE MECHANISM FOR DRIVING MULTIPLE ALTERNATORS

TECHNICAL FIELD

The described embodiments relate generally to electric vehicle drive systems, and more particularly, to recharging energy storage systems during electric vehicle operation.

BACKGROUND INFORMATION

An electric vehicle includes an energy storage system that stores electrical energy. In one example, the energy storage system comprises a plurality of battery packs. The electric vehicle converts the electrical energy stored in the battery packs into mechanical energy used to drive the vehicle. The electric vehicle has a range or distance that the electric vehicle may travel until the electrical energy stored in the battery packs is depleted. After the energy in the battery packs is depleted, the battery packs must be charged. Usually this involves leaving the electric vehicle at a charging station for an extended period of time which is undesirable. In addition, charging stations may not be readily accessible or too limited as compared to gasoline fueling stations.

One technique for charging the battery packs during operation of the electric vehicle is to employ an array of solar panels. For example, an array of solar panels is disposed along an outer surface of the electric vehicle. While the car is being driven, solar cells within the array of solar panels receive sunlight and generate electrical energy. The array of solar panels is configured to supply the generated electrical energy to the battery packs of the electric vehicle thereby charging the battery packs. Accordingly, the battery packs are charged while the electric vehicle is being driven. However, this technique is not effective if sunlight is limited due to weather conditions or darkness. A more robust solution that overcomes these shortcomings is desired.

SUMMARY

An electric vehicle drive mechanism comprises a plurality of alternators, an energy storage system, a gear system, and a telescoping shaft. The telescoping shaft comprises shaft portions that extend along an axle of the vehicle. When the vehicle is in motion, the telescoping shaft drives the alternators through the gear system. Electrical energy generated by the alternators is supplied to the energy storage system. In one example, the telescoping shaft comprises fives portions.

The foregoing is a summary and thus contains, by necessity, simplifications, generalizations and omissions of detail; consequently is it appreciated that the summary is illustrative only. Still other methods, and structures and details are set forth in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

Reference will now be made in detail to some embodiments of the invention, examples of which are illustrated in the accompanying drawings.

DETAILED DESCRIPTION

Figure 1:
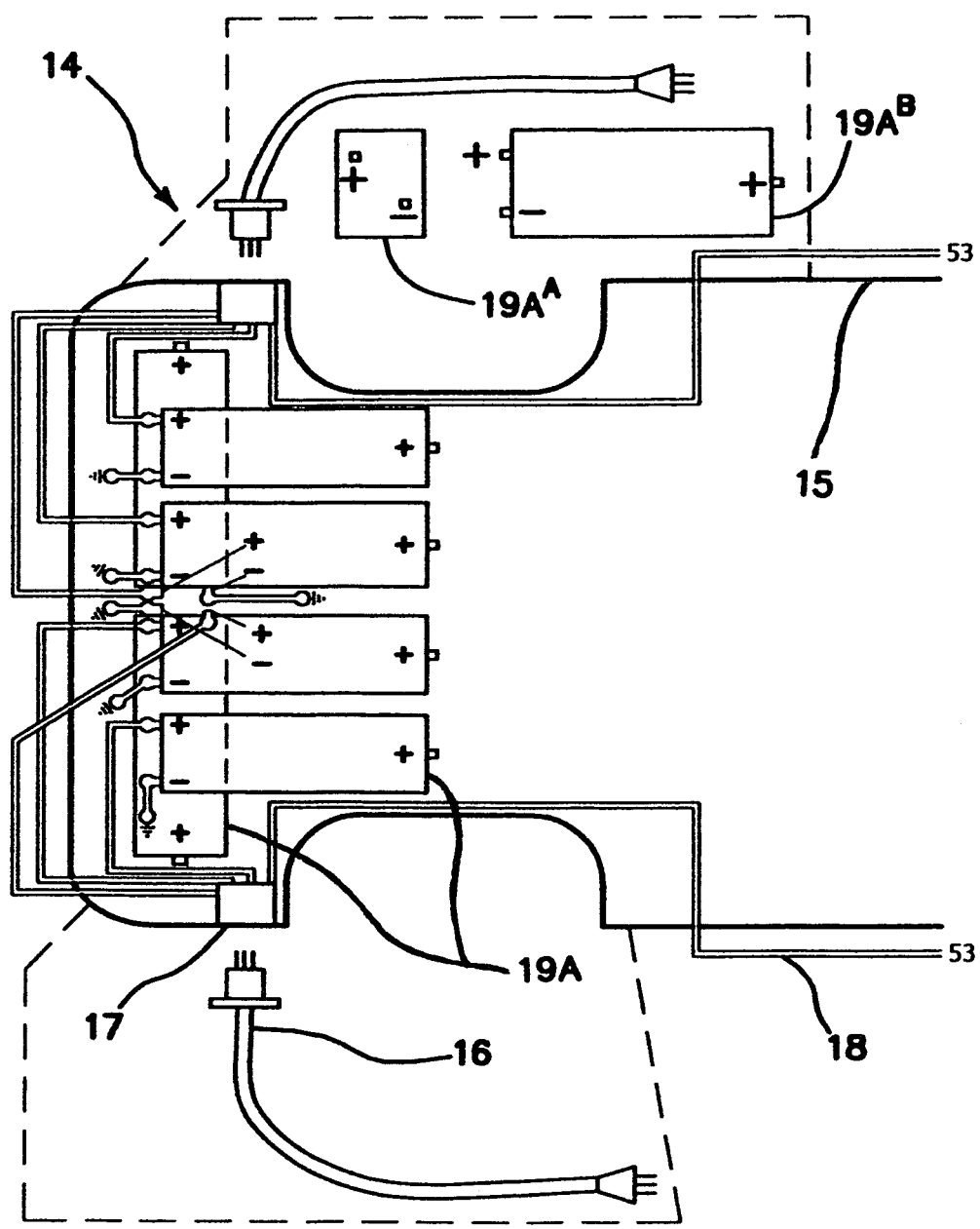
FIG. 1 is a diagram of a cross-sectional top view of a system 14 that includes a drive mechanism for driving multiple alternators disposed on a vehicle.

FIG. 1 is a diagram of a cross-sectional top view of a system 14 that includes a drive mechanism for driving multiple alternators disposed on a vehicle. System 14 comprises four wheels (not shown) and two drag wheels (not shown), a storage system, and a platform 15. The four wheels and two drag wheels are attached to platform 15. In the example of FIG. 1, the energy storage system comprises eight 48-volt Direct Current (DC) Lithium Ion batteries identified by reference numeral 19A. A 120V Alternating Current (AC) source charges the batteries 19A via two electrical cables identified by reference numeral 16. One end of electrical cable 16 is a standard plug end and an opposite end of electrical cable 16 is a plug configured to plug into charge system 17. An input of the charge system 17 receives a 120V AC input signal at 240 Hz and 5.2 amperes and supplies each of the batteries 19A thereby charging each of the batteries 19A.

The batteries 19A are arranged in a stacked fashion to fit within the vehicle. As shown in FIG. 1, four batteries are arranged side by side such that the longer sides are adjacent to one another. Two batteries are disposed below the four batteries and are arranged such that the shorter sides are adjacent to one another. Reference numerals $19A^A$ and $19A^B$ identify perspective views of one of the eight batteries showing positive and negative terminals.

Figure 2:
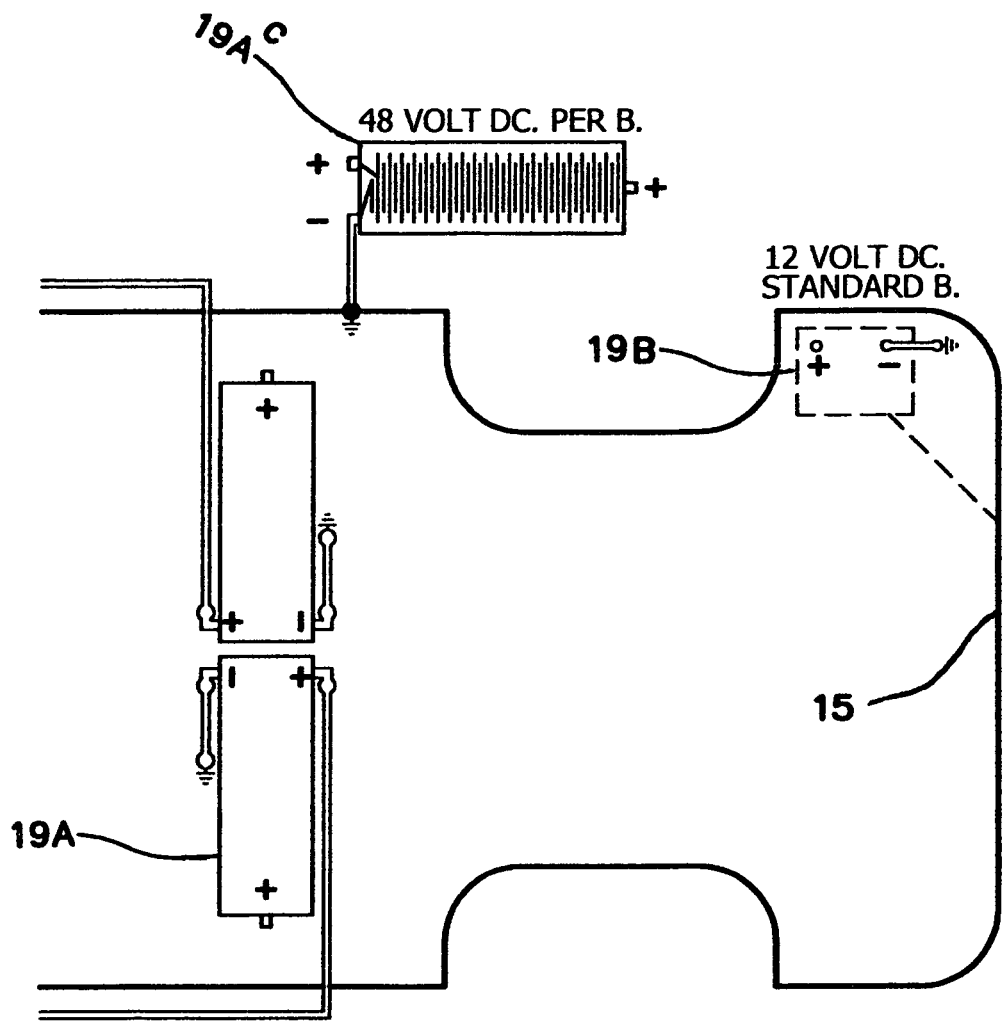
FIG. 2 is a diagram of a cross-sectional top view of a rear portion of the vehicle that shows two rear batteries 19A.

FIG. 2 is a diagram of a cross-sectional top view of a rear portion of the vehicle that shows two rear batteries 19A. Reference numeral $19A^C$ identifies yet another view of one of the eight batteries that shows the internal cells of battery 19A. Reference numeral 19B identifies a 12-volt Direct Current (DC) Lithium Ion battery.

Figure 3:
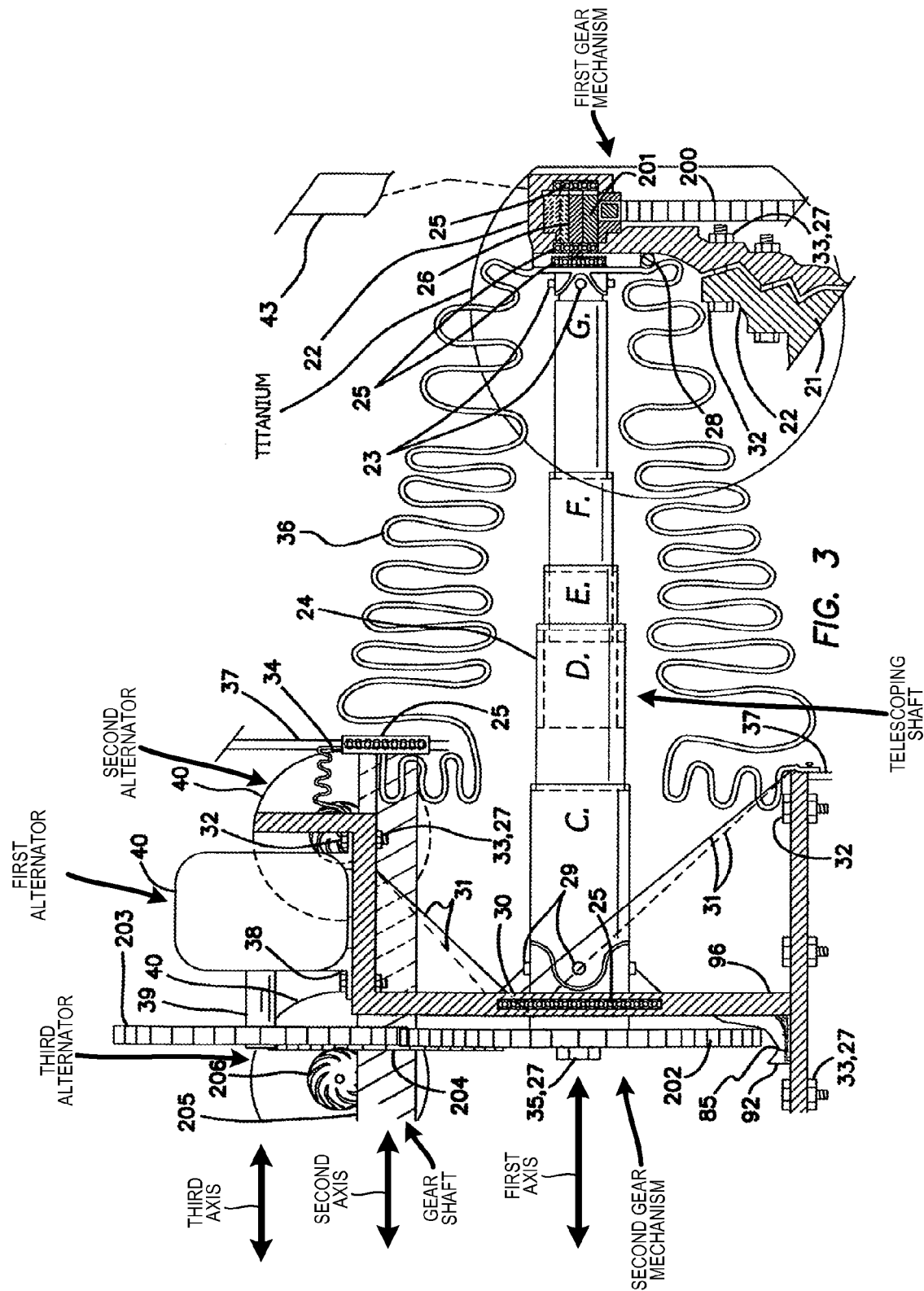
FIG. 3 is a diagram of a novel telescoping shaft 24.

FIG. 3 is a diagram of a novel telescoping shaft 24. Telescoping shaft 24 comprises portions 24C, 24D, 24E, 24F, and 24G. Portion 24G of the telescoping shaft 24 is an innermost shaft with respect to the other portions, whereas portion 24C is an outermost shaft with respect to the other portions. During braking of the vehicle when the vehicle is in motion, telescoping shaft 24 transfers mechanical power from disk 200 to disk 202. Because disk 200 is connected to a wheel of the vehicle, a part of the kinetic energy of the vehicle during braking is converted into electrical energy via alternators 40. The electrical energy generated by alternators 40 is used to charge the batteries 19A. Without the novel system, the kinetic energy of the vehicle would otherwise have been lost within brake pads and converted to heat.

When the vehicle is braking, torque is transferred from wheel 43, to disk 200, to gear mechanism 201, to portion 24G of telescoping shaft 24, and to disk 202. Housing 22 is anchored to the vehicle and comprises gear mechanism 201 and three sets of ball bearings 25 that rotate around a center axis 26 within housing 22. The gear mechanism 201 mechanically couples disk 200 to the telescoping shaft 24 via universal joint 23.

Each of the five portions of telescoping shaft 24 is lubricated with a lubricant to provide for efficient operation. A rubber cone 36 is used to maintain the lubricant disposed on the telescoping shaft 24. The rubber cone 36 is also referred to as a "rubber boot" or alternatively as a "flexible, rubber retainer". One end of the rubber cone 36 is attached to the housing 22 with screw clamp 28, and an opposite end of the rubber cone 36 is attached to a wheel wall 37 via screws. Rubber cone 36 maintains the lubricant on the telescoping shaft 24 even when the vehicle is traveling through rough terrain.

The outermost portion 24C of the telescoping shaft 24 is attached to disk 202 via universal joint 29, brackets 96 and 30, and wide ball bearing system 25. Bracket 96 is attached to the vehicle via eight bolts 32, lock washers 27, and nuts 33. Bracket 30 supports telescoping shaft portion 24C, 202 and alternator 40. During operation, the torque is transferred from telescoping shaft 24 to drive gear 202 which has a larger diameter than gear 203 and 204. Drive gear 202 drives gear 203, gear 204, and shaft 205 which in turn drives a plurality of alternators, thereby generating electrical energy during braking of the vehicle. In one example, the plurality of alternators comprises thirty-three alternators that supply charge to the energy storage system 17.

Figure 4:
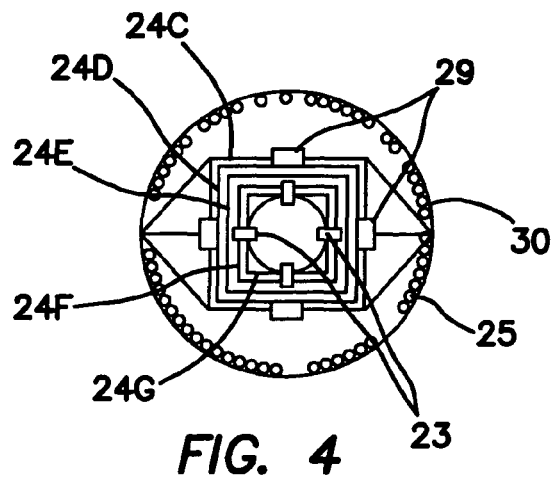
FIG. 4 is a diagram of a side view of the telescoping shaft 24 in FIG. 3.

FIG. 4 is a diagram of a side view of the telescoping shaft 24 in FIG. 3. Telescoping shaft portion 24C is the outermost portion of the telescoping shaft 24 and telescoping shaft portion 24G is the innermost portion of the telescoping shaft 24.

Figure 5:
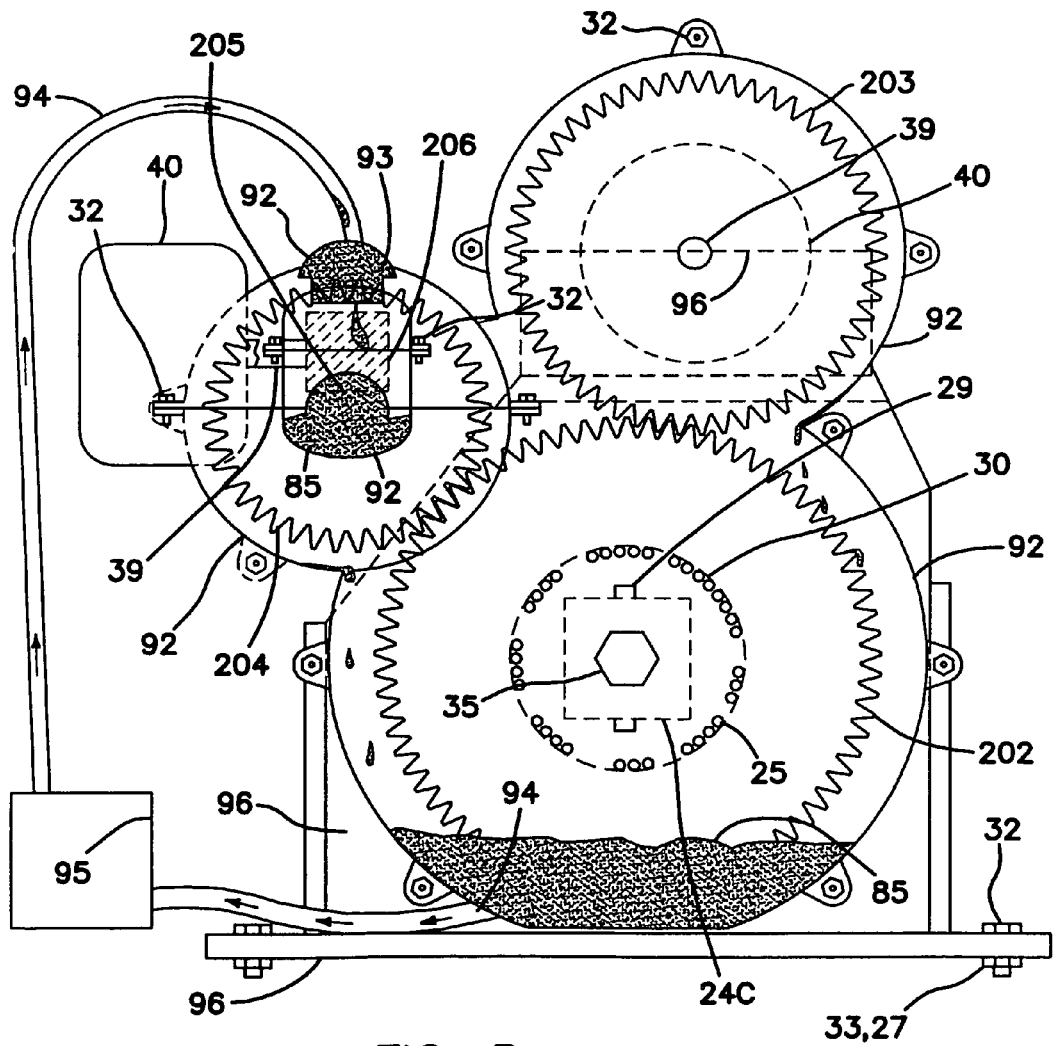
FIG. 5 is a diagram of a side view of gears 202, 203, and 204 that drive alternators 40.

FIG. 5 is a diagram of a side view of gears 202, 203, and 204 that drive alternators 40. Gears 202, 203, and 204 are encased within a lubrication system 92 comprising lubricant 85, a lubricant container, a lubricant circulation pump 95, and a sealing cap 93. Lubricant circulation pump 95 circulates lubricant 85 from the lubricant container to gears 202, 203, and 204. Lubricant 85 results in more efficient operation of gears 202, 203, and 204 than if lubricant 85 was not present.

Figure 6:
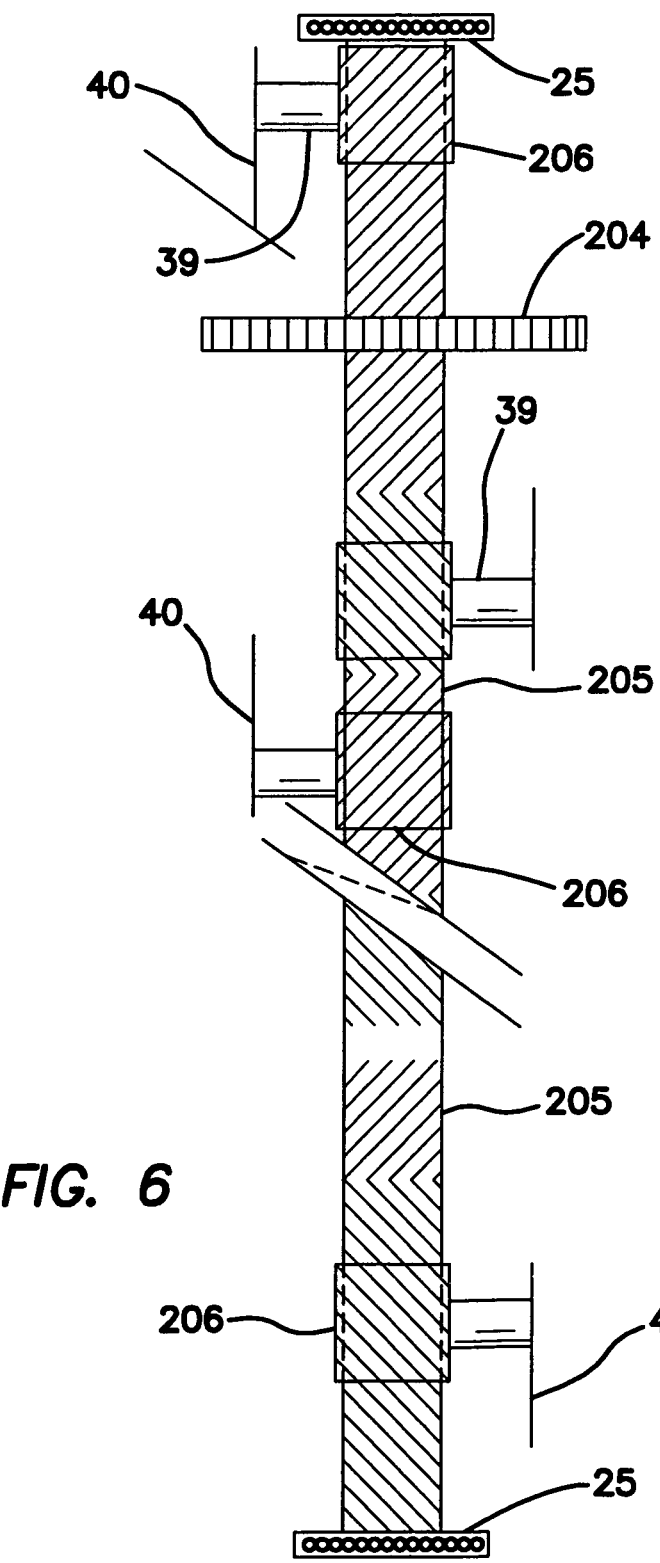
FIG. 6 is a diagram showing one technique for driving alternators 40.

FIG. 6 is a diagram showing one technique for driving alternators 40. Linear drive gear 205 includes threads oriented in a fashion such that alternators 40 are driven while being disposed on both sides of linear drive gear 205. Linear drive gear 205 is attached to the vehicle via ball bearings 25 and is rotated by drive gear 204.

Figure 7:
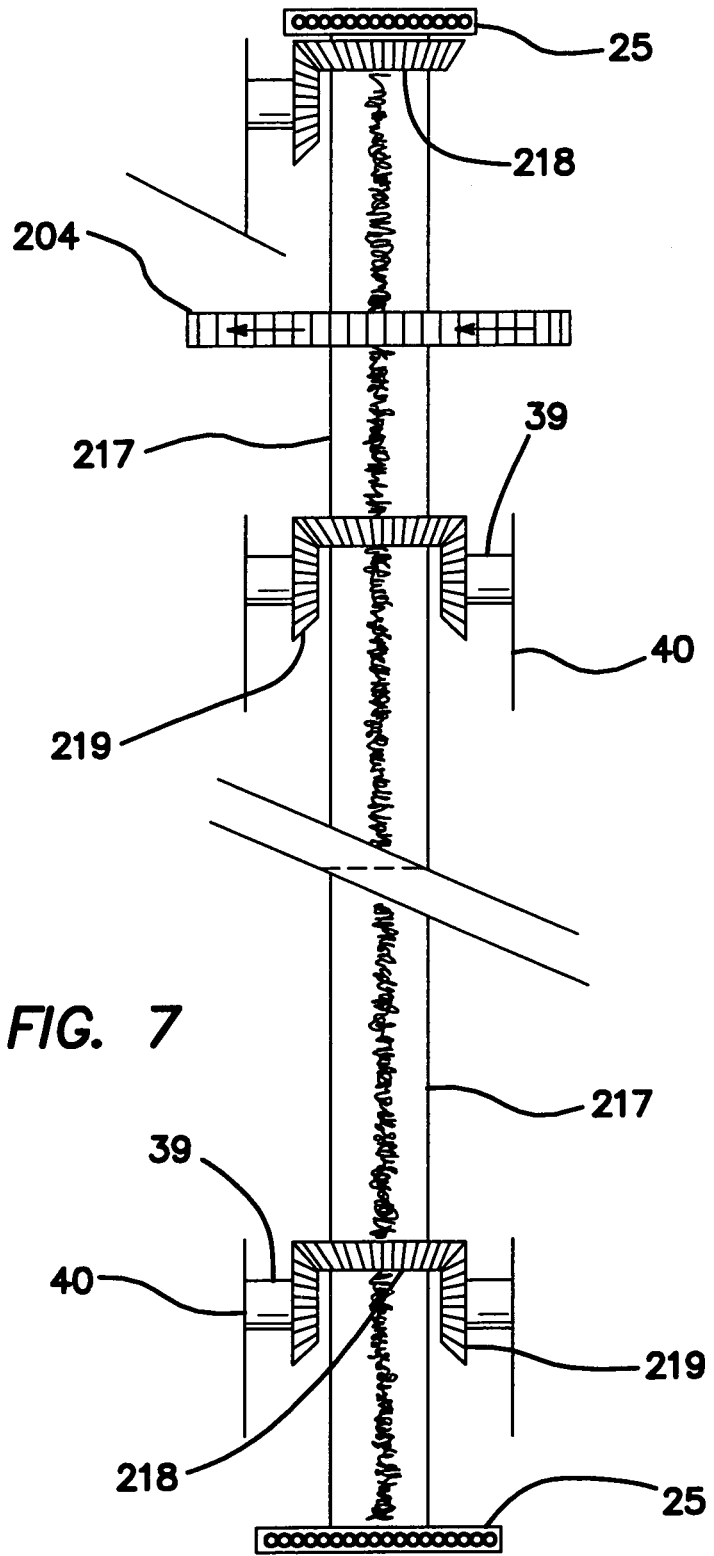
FIG. 7 is a diagram showing a second technique for driving alternators 40.

FIG. 7 is a diagram showing a second technique for driving alternators 40. Drive gear 202 is mechanically coupled to gear 204, which in turn drives rod gear 217, which in turn drives a 45-degree angle gear 218, which in turn drives 45-degree angle gear 219 that is attached to shaft 39 of alternator 40. Rod gear 217 is attached to support bracket 96 via ball bearings 25.

Figure 8:
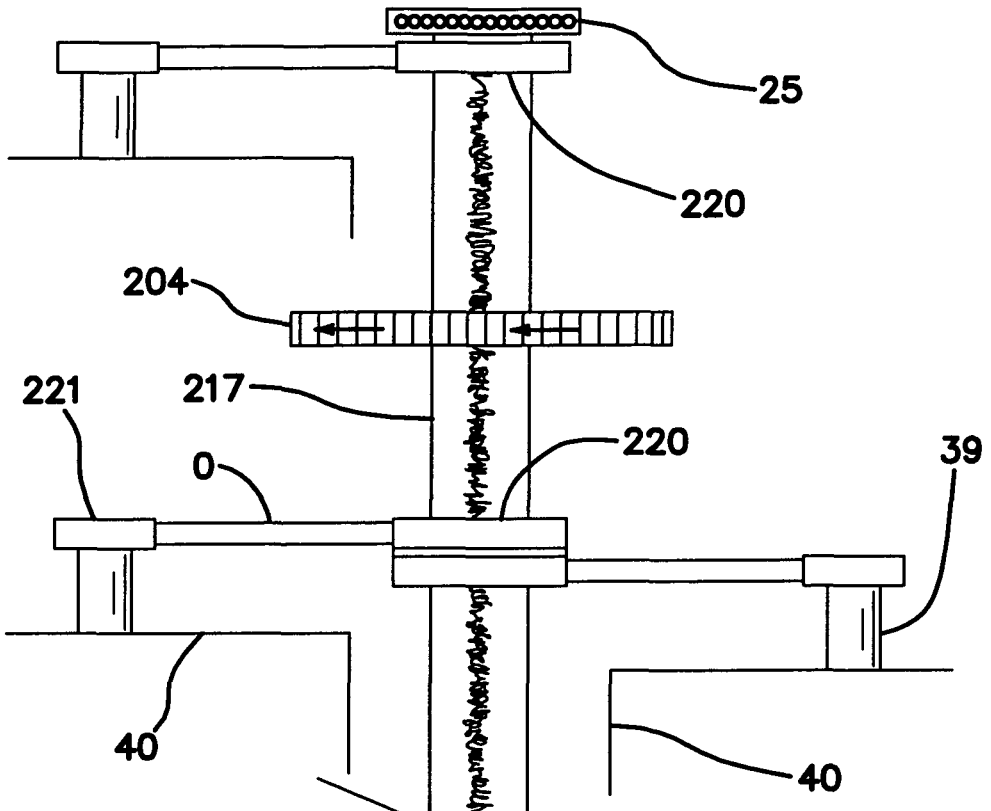
FIG. 8 is a diagram showing a third technique for driving alternators 40.
Figure 8:
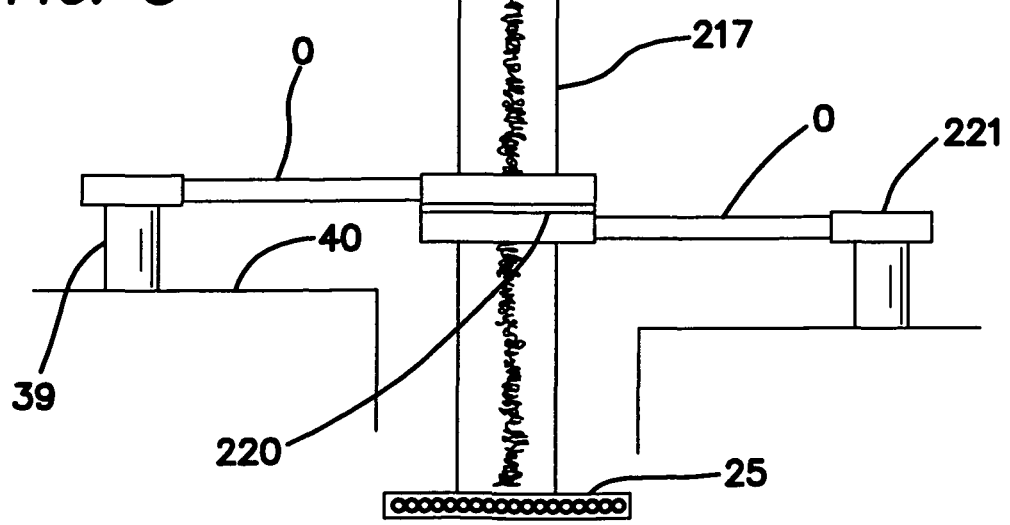

FIG. 8 is a diagram showing a third technique for driving alternators 40. Drive gear 202 is mechanically coupled to gears 203 and 204, which rotates rod gear 217 via a belt-pulley system. One example of the belt-pulley system comprises drive pulley 220, pulley belt 0, and alternator pulley 221. Pulley belt 0 couples drive pulley 220 to alternator pulley 221. Accordingly, the belt pulley-system shown in FIG. 8 transfers mechanical energy from shaft 217 to alternators 40 via alternator shaft 39.

Figure 9:
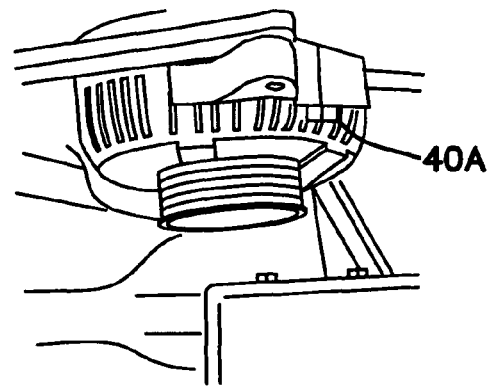
FIG. 9 is a perspective diagram of one alternator 40A disposed on the vehicle.

FIG. 9 is a perspective diagram of one alternator 40A disposed on the vehicle.

Figure 10:
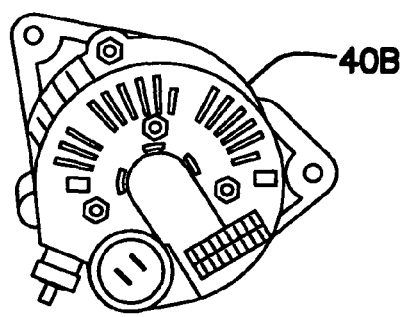
FIG. 10 is a perspective rear view of alternator 40B.

FIG. 10 is a perspective rear view of alternator 40B.

Figure 11:
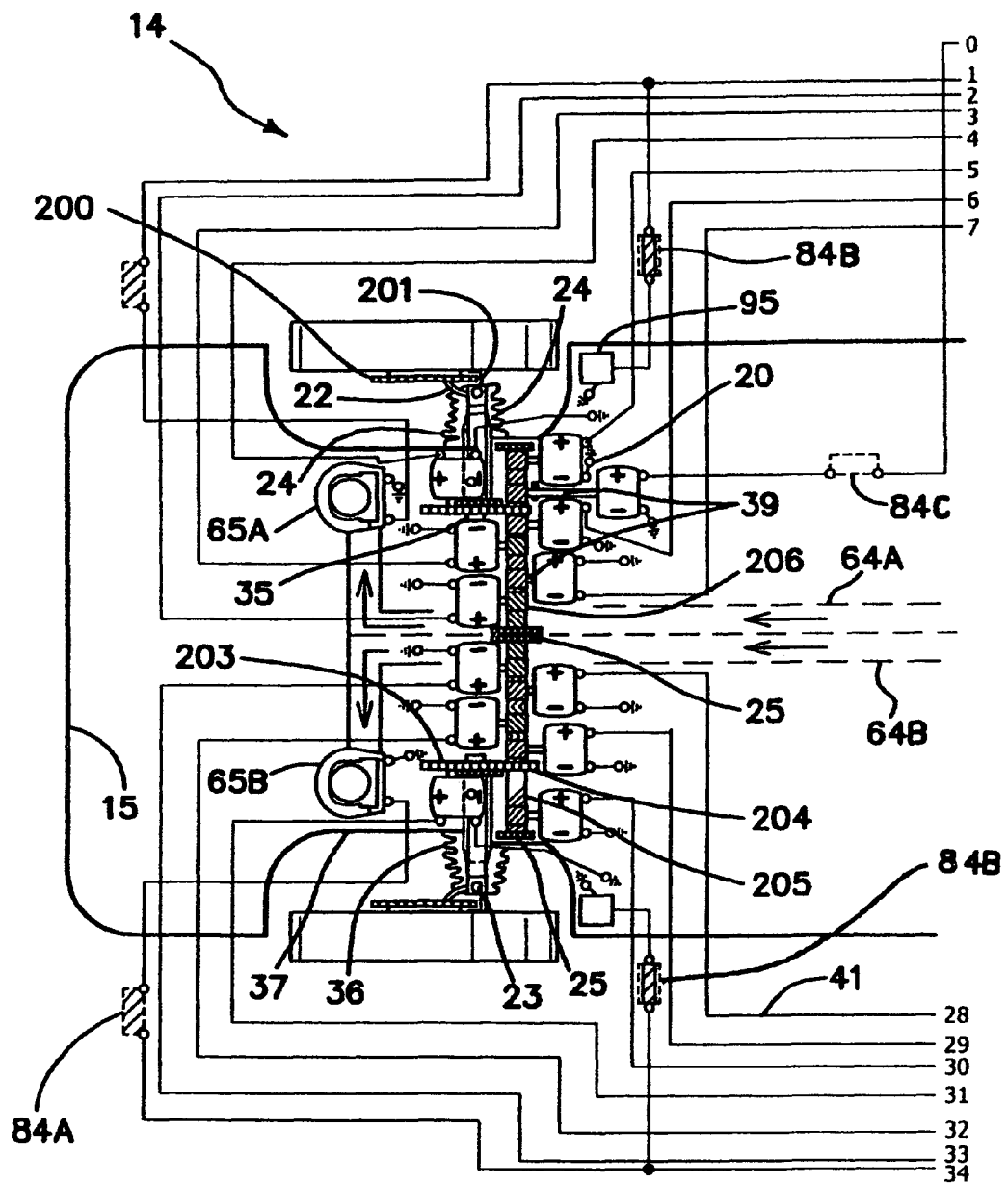
FIG. 11 is a diagram of a top view of a preferred embodiment of the telescoping shaft configuration that illustrates the shaft system's relationship with the wheel system, the inner gears, and the screw gears.

FIG. 11 is a diagram of a top view of a preferred embodiment of the telescoping shaft configuration that illustrates the shaft system's relationship with the wheel system, the inner gears, and the screw gears. Rotating wheel 43 drives gear 200, gear 201, and universal joint 23 which is coupled to and drives telescoping shaft 24. Shaft 24 then drives drive gear 202, which in turn drives alternator 40 via the technique shown in FIG. 6. Energy generated by alternators 40 is used to charge batteries 19A. Reference numerals 84A, 84B, and 84C also identify oil pump fuses.

Figure 12:
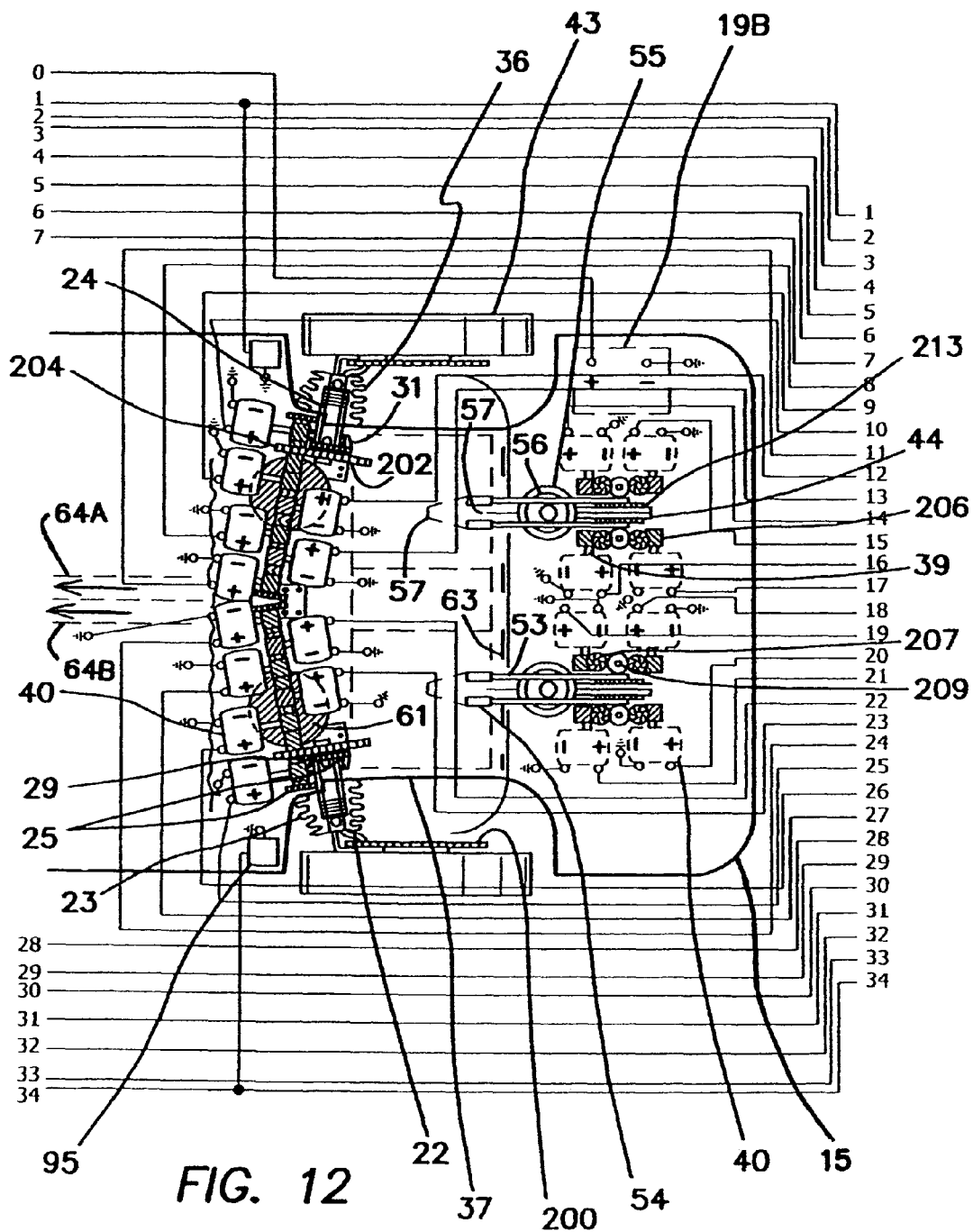
FIG. 12 is a diagram of a top view of a preferred embodiment of the telescoping shaft configuration located at the rear end of the vehicle that illustrates the shaft system's relationship with the wheel system, the inner gears, and the screw gears.

FIG. 12 is a diagram of a top view of a preferred embodiment of the telescoping shaft configuration located at the rear end of the vehicle that illustrates the shaft system's relationship with the wheel system, the inner gears, and the screw gears. The telescope shaft configuration is similar to that shown in FIG. 11. The rear end of the vehicle also comprises a drag wheel system that also drives a portion of the alternators 40. The drag wheel system is shown in more detail in FIGS. 21 and 22.

Figure 13:
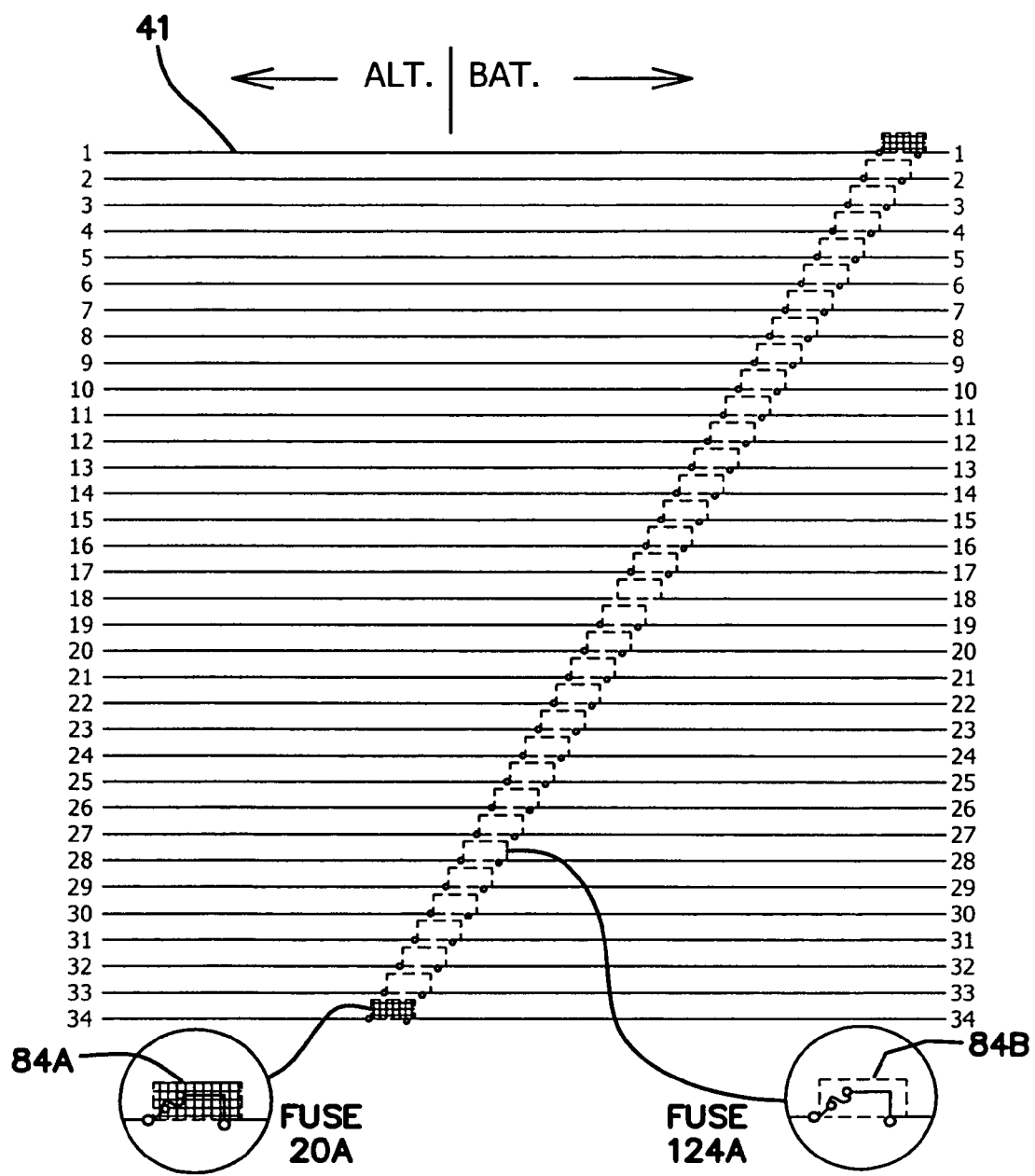
FIG. 13 is a diagram of a fuse system disposed between alternators 40 and batteries 19A.

FIG. 13 is a diagram of a fuse system disposed between alternators 40 and batteries 19A. Reference numeral 41 identifies various conductors electrically coupled between alternators 40 and batteries 19A. The fuse system protects the batteries 19A from undesirable supply voltages that may occur during operation.

Figure 14:
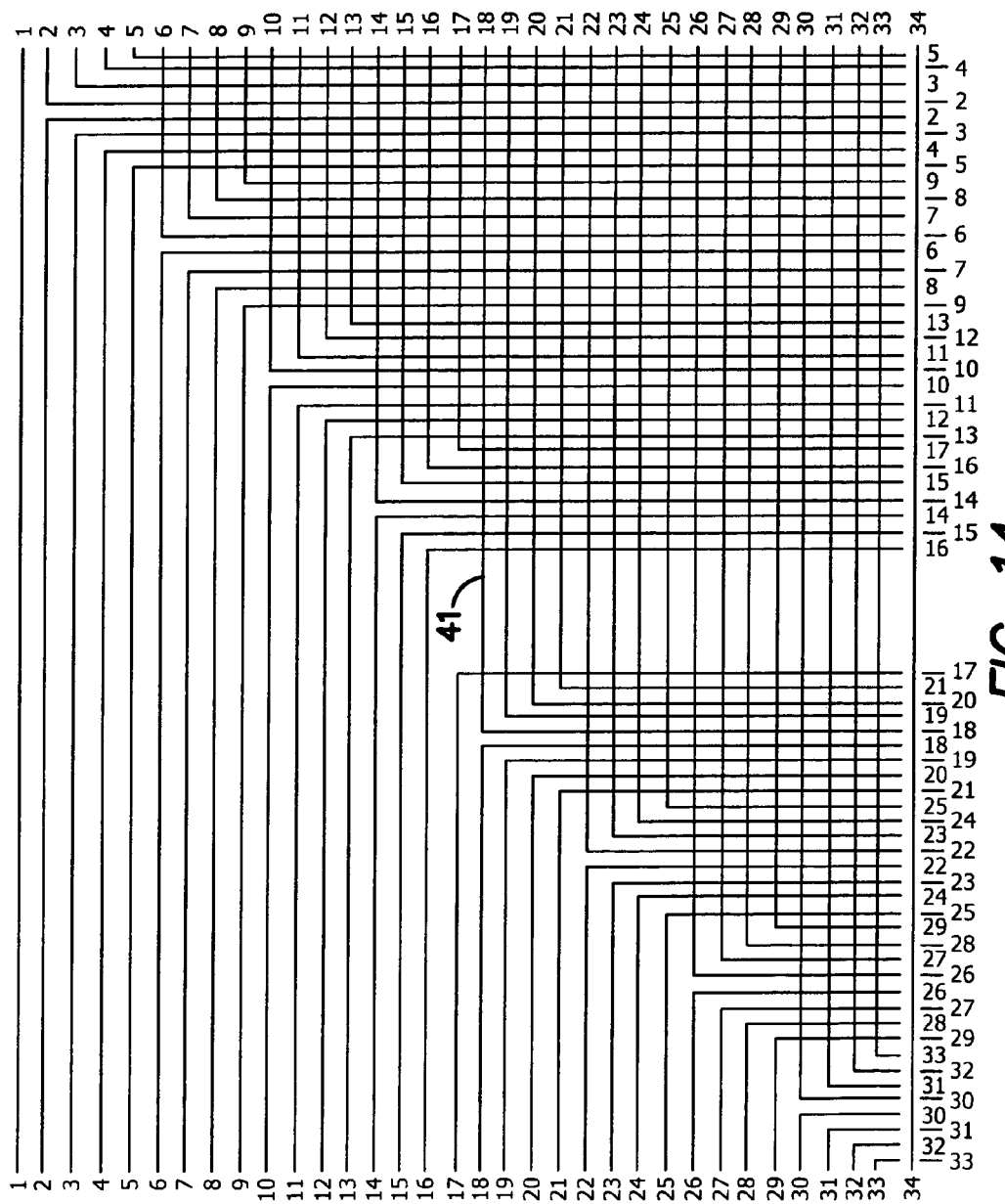
FIG. 14 is a diagram of various conductors 41 as they extend through the fuse system.

FIG. 14 is a diagram of various conductors 41 as they extend through the fuse system. Numerals are used to indicate ends of conductors that are electrically coupled together.

Figure 15:
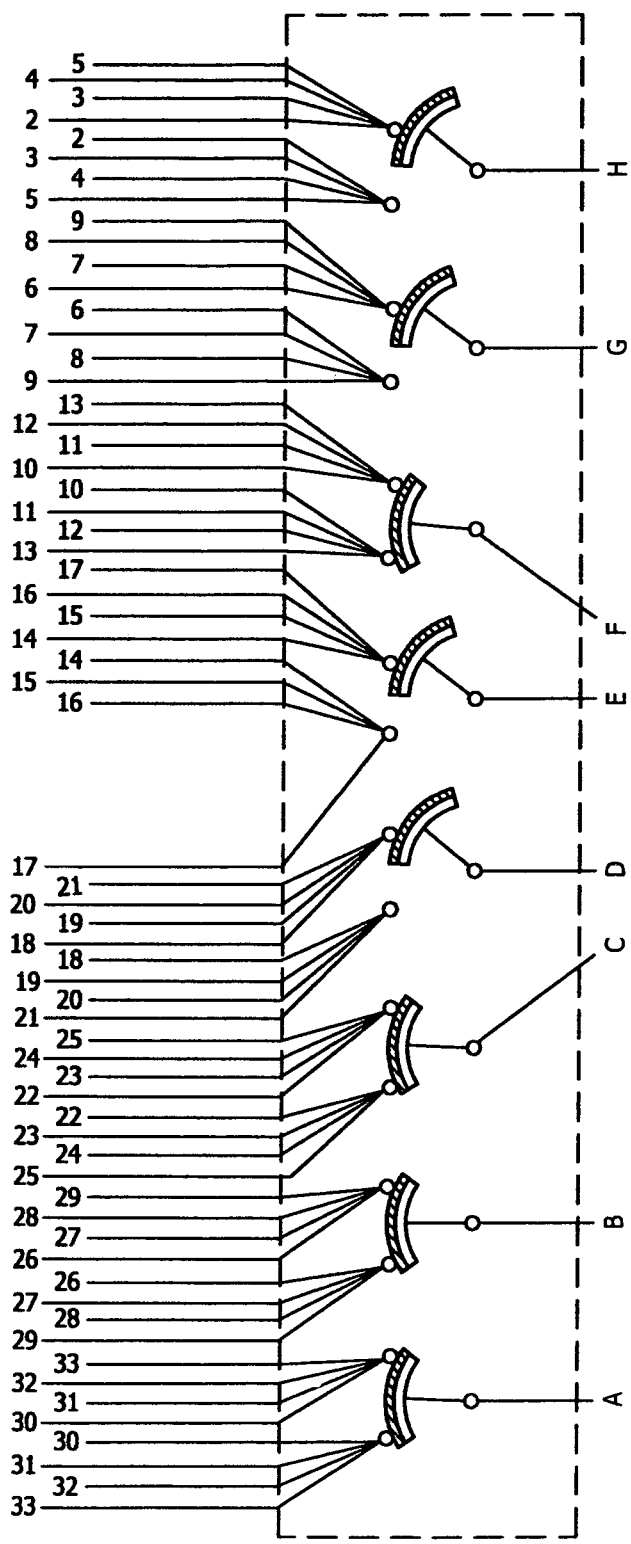
FIG. 15 is a diagram of a switching mechanism identified by a dashed rectangular box.

FIG. 15 is a diagram of a switching mechanism identified by a dashed rectangular box. Conductors 41 extend through the switching mechanism as shown in FIG. 15. The switching mechanism is controlled to uncouple the batteries 19A from the alternators 40 under an overcharge condition.

Figure 16:
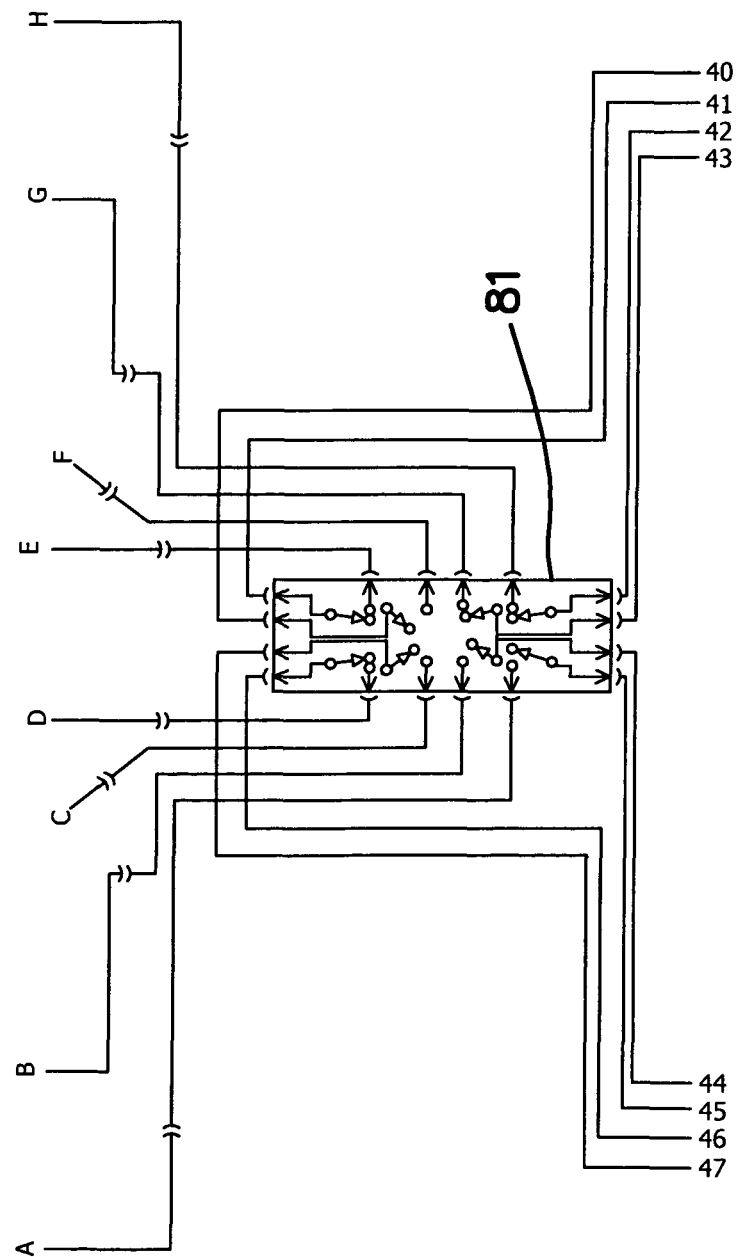
FIG. 16 is a diagram of a relay 81.

FIG. 16 is a diagram of a relay 81. Conductors 41 extend through the relay 81 as shown in FIG. 16. The relay 81 is engaged by a controller 83 (shown in FIG. 17) when an overcharge condition is detected.

Figure 17:
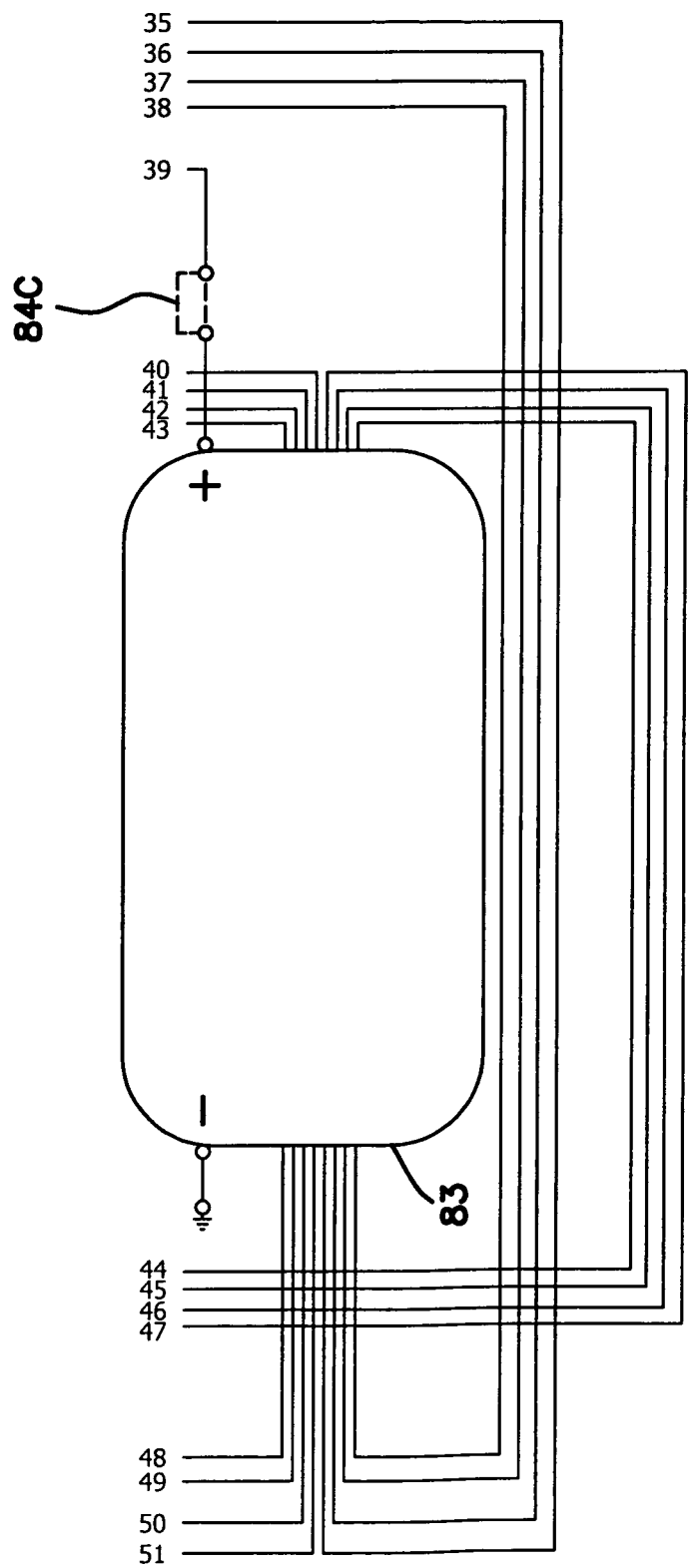
FIG. 17 is a high level diagram of a controller 83.

FIG. 17 is a high level diagram of a controller 83. Controller 83 is configured to receive a signal from an overcharge sensor 80 (shown in FIG. 18) where the signal is indicative of an overcharge condition of the batteries 19A. When a controller 83 receives the signal from the overcharge sensor 80, a controller 83 controls the relay 81 to protect batteries 19A.

Figure 18:
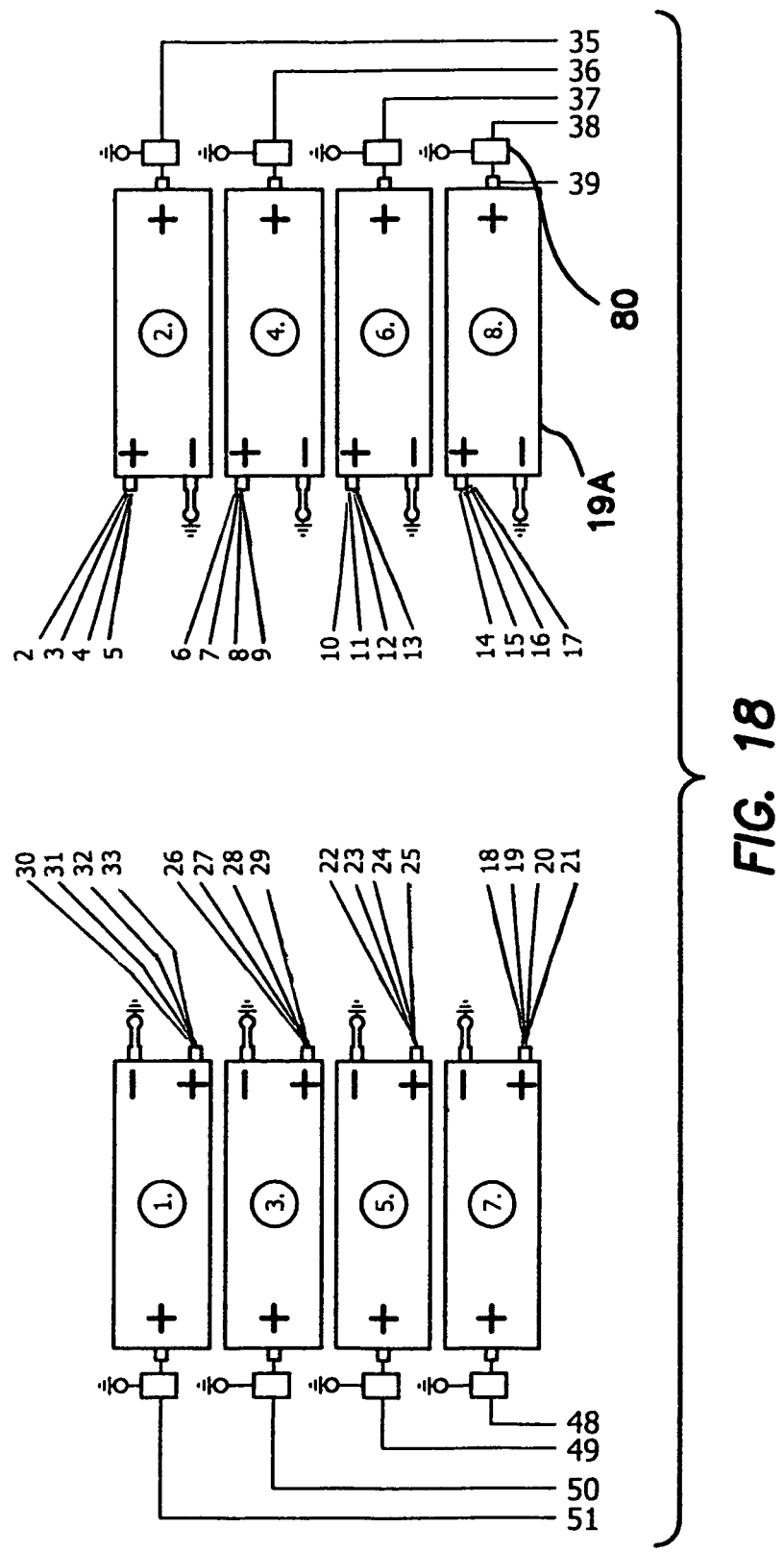
FIG. 18 is a diagram showing how each of the eight batteries 19A is coupled to overcharge sensors 80.

FIG. 18 is a diagram showing how each of the eight batteries 19A is coupled to overcharge sensors 80. The conductors 41 are coupled to terminals of the batteries 19A and to overcharge sensors 80 as shown in FIG. 18.

Figure 19:
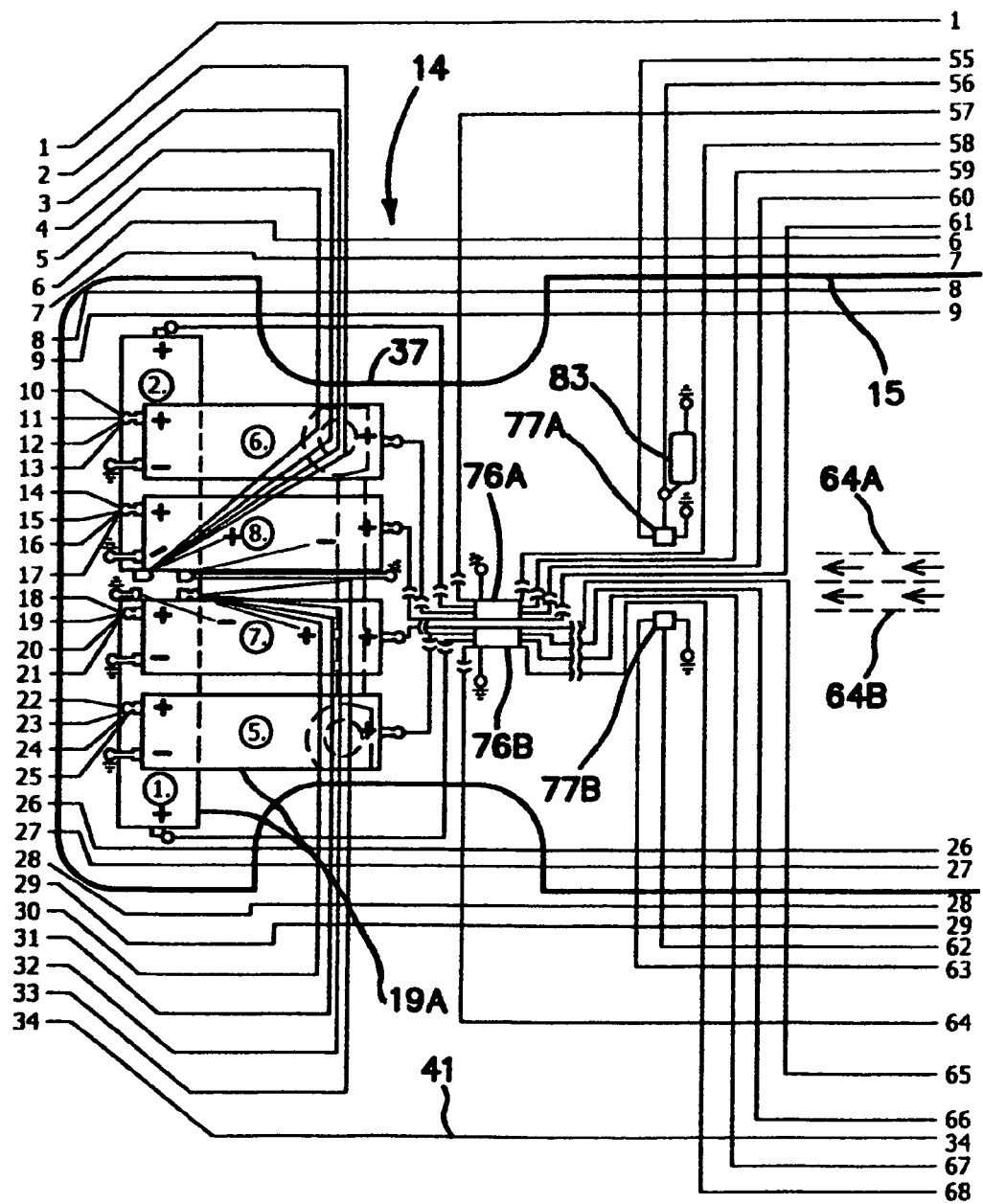
FIG. 19 is a diagram of a top view of the system that includes the fuse system.

FIG. 19 is a diagram of a top view of the system that includes the fuse system. The fuse system comprises conductors 41, controller 83. The electrical energy from batteries 19A is directed towards the batteries 19A at the rear part of the vehicle and control throttles 76A and 76B, which in turn control motors 66 (shown in FIG. 20) via switches 77A and 77B. Reference numerals 64A and 64B identify air vent ducts that circulate air through the system as shown by lines and arrows in FIG. 19.

Figure 20:
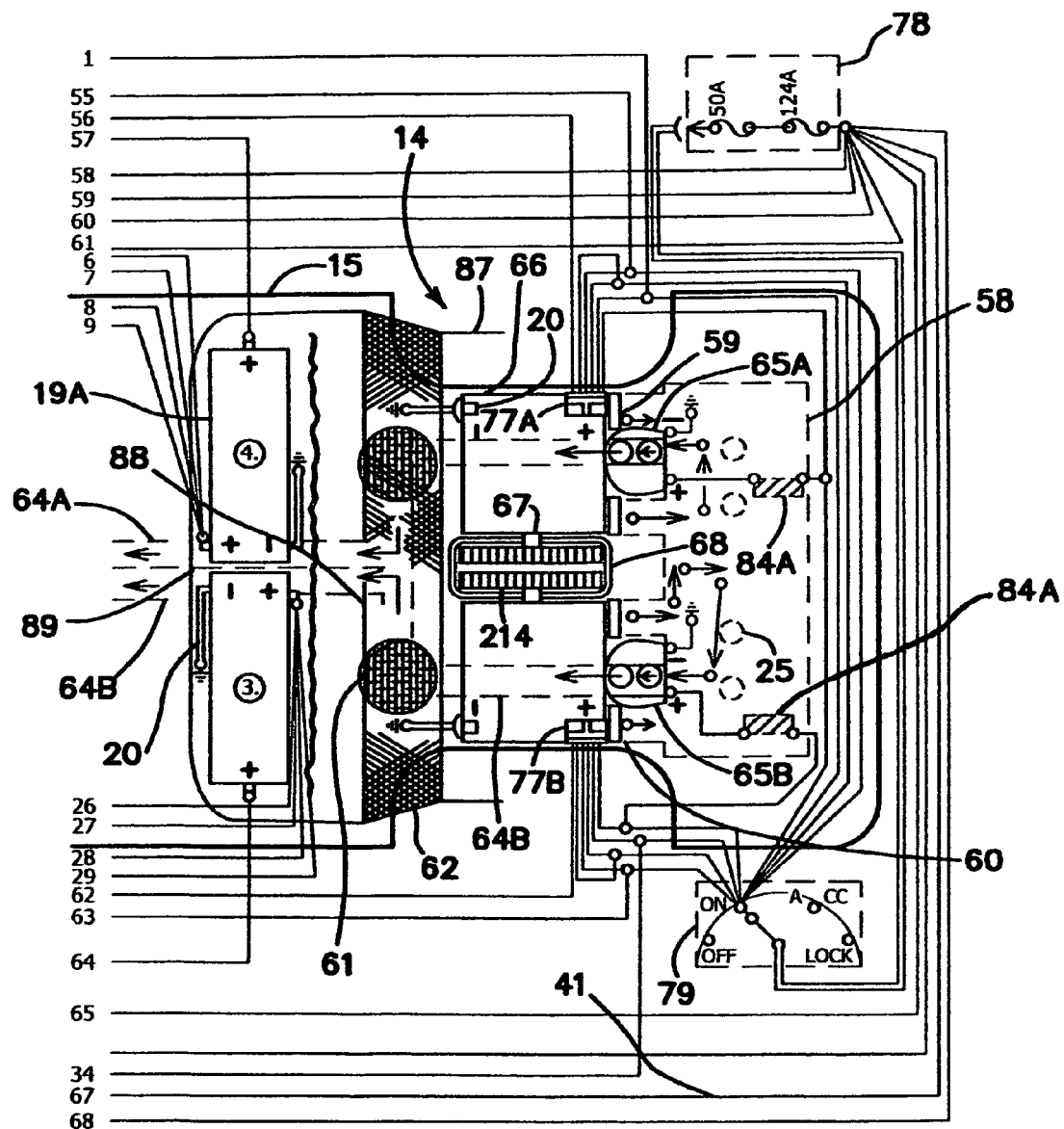
FIG. 20 is a diagram of a top view of the system at the rear part of the vehicle that includes the fuse system.

FIG. 20 is a diagram of a top view of the system at the rear part of the vehicle that includes the fuse system. Two batteries are identified by reference numerals "3." and "4." enclosed in circles which are disposed beneath the rear seats 89. In addition, rectangular vents 62 and round vents 61 are configured to supply air to rear wheels 43, drag wheels, and alternators 40. A pan 58 is disposed beneath alternators 40 to protect alternators 40. The pan 58 is anchored via bolts 32, washer 27, and nuts 33 to the rear floor 42.

In this example, each of the motors 66 is an eight horsepower DC motor that is disposed at the rear and center of platform 15. Motors 66 are arranged in a face to face configuration. Each of the motors 66 is coupled to a drive gear 214 via a drive shaft 67.

Figure 21:
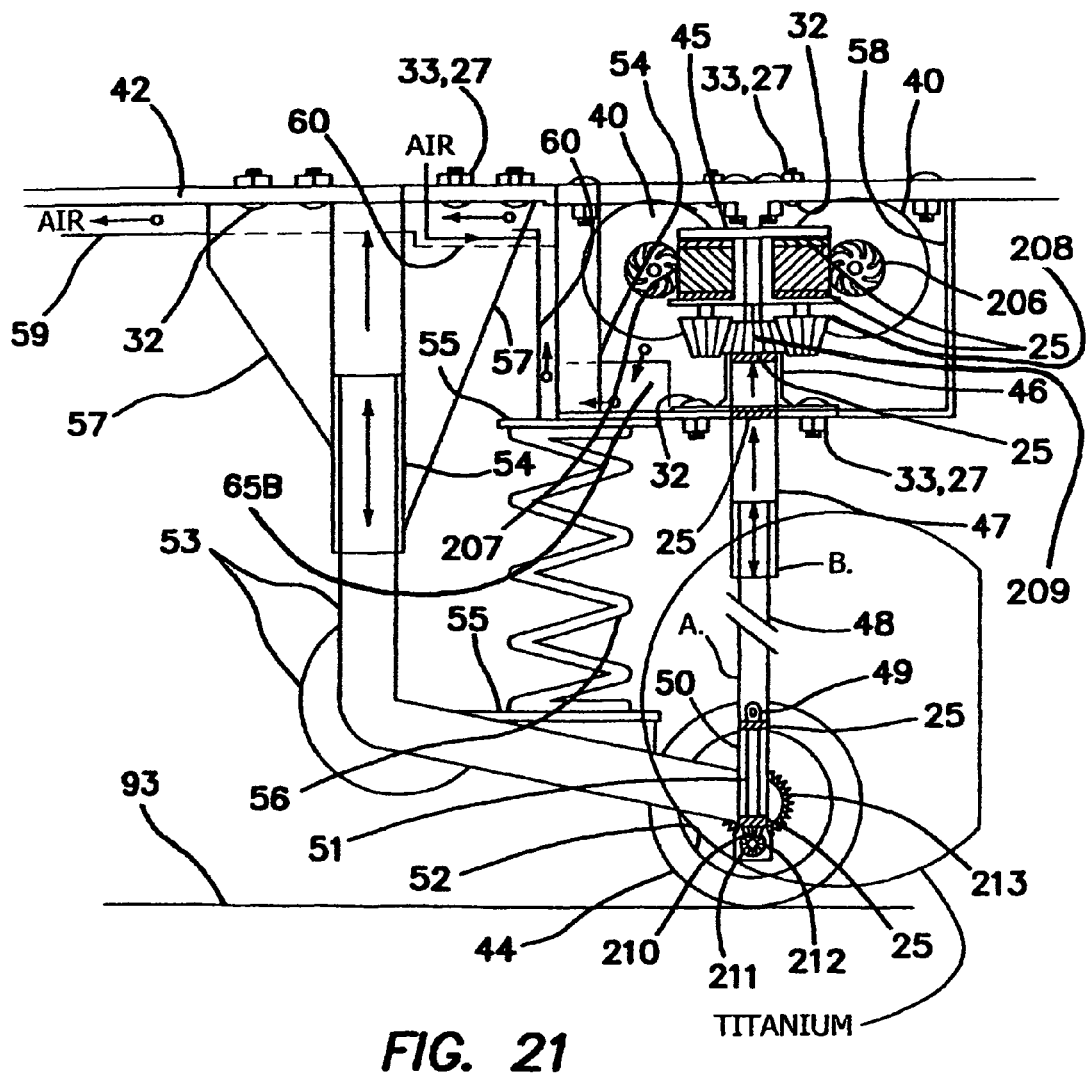
FIG. 21 is a diagram of the side view of drag wheel system 44 that also charges alternators 40.

FIG. 21 is a diagram of the side view of drag wheel system 44 that also charges alternators 40. In other embodiments, the drag wheel system 44 is omitted.

The drag wheel system 44 is supported by rear floor 42 via three structures. From left to right, the first structure comprises a rectangular tube support 54 a V shaped brace 57 and an L bar 53. Both rectangular tube support 54 and V shaped brace 57 are anchored to the floor 42 of the platform 15. One end of the L bar 53 is inserted into the rectangular support 54. One end of the L bar may move inside the support 54 to dampen the movement of drag wheels 44 when movement of wheel is perpendicular to the ground.

The second structure comprises a coil 56 and bases 55. The coil 56 is also used to dampen the movement of drag wheels 44 when the movement is perpendicular to the ground. Drag wheels 44 is thus maintained on the ground. The coil 56 is disposed between base structures 55. Each end of the coil 56 is attached to the separate parts of base 55.

The third structure comprises gear 210, gear 211, gear 212, drive shaft 51, a housing 50, universal joint 49, square drive bar 48, ball bearings 25, 45 degree angle gear 208, 45 degree angle gear 209, screw gears 206 and alternators 40. The square drive bar 48 functions the same way as telescope shaft 24. The rotation of the drag wheels 44 results in the rotation of screw gear 206 which rotates alternator 40.

Figure 22:
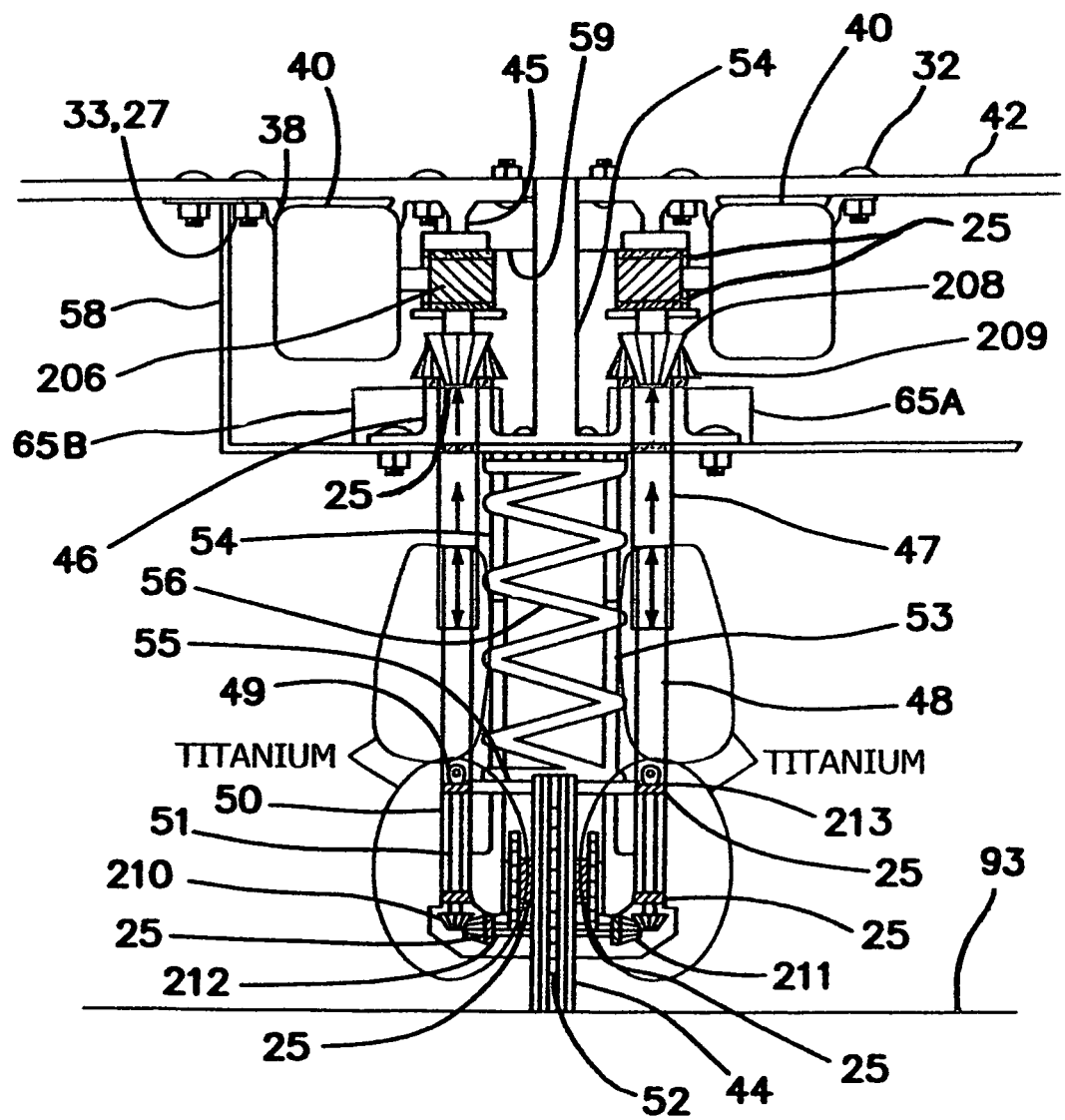
FIG. 22 is a diagram of a rear perspective of the drag wheels 44 that also drive alternators 40.

FIG. 22 is a diagram of a rear perspective of the drag wheels 44 that also drive alternators 40. Vents 65A and 65B supply outside air to the internal system to cool the cabin, pan 58, and alternators 40. Both vents are located at the lower portion of pan 58.

Figure 23:
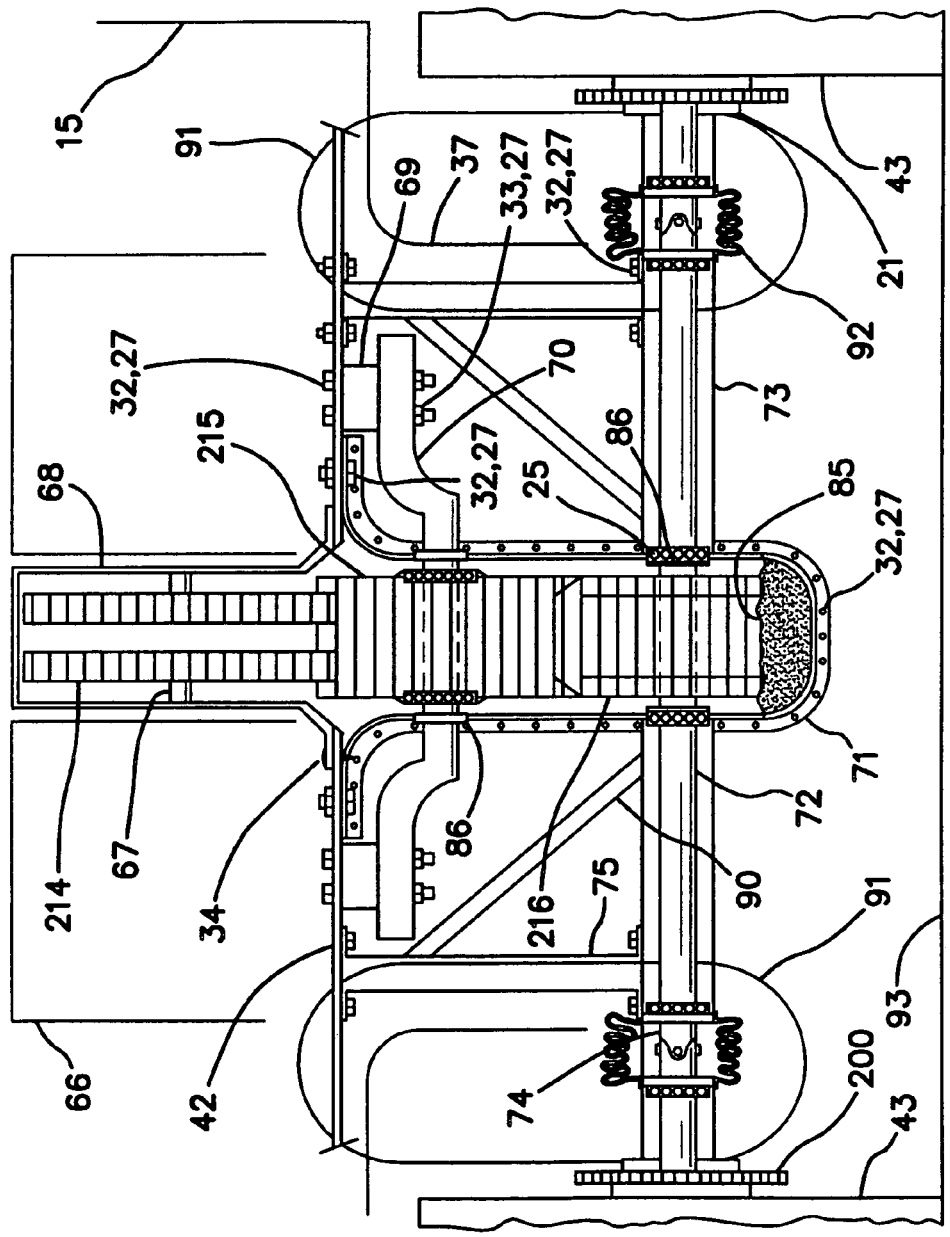
FIG. 23 is a diagram showing the mechanism for motors 66 to drive wheels 43 when energy is needed to be added into the vehicle system.

FIG. 23 is a diagram showing the mechanism for motors 66 to drive wheels 43 when energy is needed to be added into the vehicle system. Motors 66 are controlled to drive shaft 67, which in turn drives gear 214, which in turn drives gear 215, which in turn drives gear 216, which in turn drives shaft 72. Shaft 72 is coupled by a universal joint 74 to gear 200 which is attached to wheels 43. Motors 66 are powered by batteries 19A which supply additional power to the system and rotate wheels 43. The above gear system is lubricated by lubricant 85 stored in housing 71. The drive shaft is covered by a drive shaft housing 73, which is supported by two columns 75 and angle brace 90. Universal joint 74 is protected by a rubber boot 92.

Gears 214 are housed in a gear cover 68, which is anchored to the floor 42 by screws 34. Gear 215 is supported by Bracket 70 which is attached to the platform 15 by a structure 69. Structure 69 attaches bracket 70 to platform 15 via bolts 32, washers 27 and nuts 33. In addition, numeral reference 86 identifies rubber seals 86 and numeral reference 25 identifies ball bearings.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

The invention claimed is:

1. An electric vehicle comprising:
   a first gear mechanism that is coupled to a wheel of the electric vehicle;
   a second gear mechanism;
   a telescoping shaft having a first end and a second end, wherein the telescoping shaft extends along a first axis;
   a first universal joint, wherein the first universal joint is disposed at the first end of the telescoping shaft, and wherein the first universal joint couples the first end of the telescoping shaft to the first gear mechanism;
   a second universal joint, wherein the second universal joint is disposed at the second end of the telescoping shaft, and wherein the second universal joint couples the second end of the telescoping shaft to the second gear mechanism; and
   a gear shaft having a first end and a second end, wherein the gear shaft is disposed above the telescoping shaft, wherein the gear shaft extends along a second axis, wherein the second axis is parallel to the first axis, and wherein the gear shaft is coupled to the second gear mechanism such that a rotation of the wheel rotateably engages the gear shaft.

2. The electric vehicle of claim 1, wherein the second gear mechanism comprises:
   a first gear, wherein the second universal joint is coupled to the first gear, and wherein the first axis extends through a center of the first gear;
   a second gear, wherein the gear shaft is coupled to the second gear, wherein the second axis extends through a center of the second gear, and wherein the center of the second gear is disposed above the center of the first gear; and
   a third gear, wherein a center of the third gear is disposed above the center of the second gear.

3. The electric vehicle of claim 2, wherein the first gear has a first diameter, wherein the second gear has a second diameter, wherein the third gear has a third diameter, wherein the first diameter is greater than the second diameter, wherein the first diameter is greater than the third diameter, and wherein the second diameter is less than the third diameter.

4. The electric vehicle of claim 2, wherein the electric vehicle further comprises:
   a first alternator having a first alternator shaft, wherein the first alternator shaft extends along a third axis, wherein the first alternator shaft is coupled to the center of the third gear, wherein the third axis extends through the center of the third gear.

5. The electric vehicle of claim 4, wherein the third axis is parallel to the first axis, and wherein the third axis is parallel to the second axis.

6. The electric vehicle of claim 4, wherein the electric vehicle further comprises:
a second alternator having a second alternator shaft, wherein the second alternator shaft extends along a fourth axis, wherein the second alternator shaft is coupled to the gear shaft, and wherein the fourth axis is perpendicular to the third axis.

7. The electric vehicle of claim 6, wherein the electric vehicle further comprises:
a third alternator having a third alternator shaft, wherein the third alternator shaft extends along a fifth axis, wherein the third alternator shaft is coupled to the gear shaft, wherein the fifth axis is parallel to the fourth axis, and wherein the fifth axis is perpendicular to the third axis.

8. The electric vehicle of claim 7, wherein the first alternator, the second alternator, and the third alternator are engaged during the rotation of the wheel thereby generating electrical energy.

9. The electric vehicle of claim 7, wherein the first alternator is disposed in between the second alternator and the third alternator.

10. The electric vehicle of claim 2, wherein the electric vehicle further comprises:
a plurality of alternators, wherein each of the plurality of alternators includes an alternator shaft, wherein one of the plurality of alternators has an alternator shaft that is coupled to the third gear of the second gear mechanism, and wherein each of the other of the plurality of alternators has an alternator shaft that is coupled to the second gear of the second gear mechanism.

11. The electric vehicle of claim 1, wherein the electric vehicle further comprises:
a rubber housing, wherein the rubber housing has a conical shape, and wherein the rubber housing encloses the telescoping shaft, the first universal joint, and the second universal joint.

12. The electric vehicle of claim 1, wherein the telescoping shaft comprises a plurality of bar elements each having a thickness, wherein the thickness of the bar element adjacent to the first end is less than the thickness of the bar element adjacent to the second end.

13. The electric vehicle of claim 1, wherein the electric vehicle further comprises:
a platform, wherein the second gear mechanism, the telescoping shaft, the first universal joint, the second universal joint, and the gear shaft are disposed above the platform.

14. The electric vehicle of claim 1, further comprising:
a third gear mechanism that is coupled to a second wheel of the electric vehicle;
a fourth gear mechanism;
a second telescoping shaft having a first end and a second end, wherein the second telescoping shaft extends along the first axis;
a third universal joint, wherein the third universal joint is disposed at the first end of the second telescoping shaft, and wherein the third universal joint couples the first end of the second telescoping shaft to the third gear mechanism;
a fourth universal joint, wherein the fourth universal joint is disposed at the second end of the second telescoping shaft, and wherein the fourth universal joint couples the second end of the second telescoping shaft to the fourth gear mechanism; and
a second gear shaft having a first end and a second end, wherein the second gear shaft is disposed above the second telescoping shaft, wherein the second gear shaft extends along the second axis, and wherein the second gear shaft is coupled to the fourth gear mechanism such that a rotation of the second wheel rotateably engages the second gear shaft.

15. The electric vehicle of claim 14, wherein the second wheel is disposed opposite the first wheel.

16. The electric vehicle of claim 14, wherein the second end of the first gear shaft is adjacent to the second end of the second gear shaft.

17. The electric vehicle of claim 14, wherein the first gear shaft drives at least four alternators, and wherein the second gear shaft drives at least four alternators.

* * * * *